United States Patent [19]

Degli Angeli et al.

[11] Patent Number: 5,780,084
[45] Date of Patent: Jul. 14, 1998

[54] PROCESS FOR PREPARING LAYERED AND PUFFED PASTRY PRODUCTS

[75] Inventors: Alessandro Degli Angeli, Parma; Valter Conci, Trento; Luciano Eccher, Trento; Luca Colato, Trento, all of Italy

[73] Assignee: M.G. Braibanti S.p.A., Milan, Italy

[21] Appl. No.: 656,865

[22] Filed: May 30, 1996

[30] Foreign Application Priority Data

Jun. 8, 1995 [IT] Italy ................... MI95A1209

[51] Int. Cl.$^6$ ................... A21D 8/00; A21D 13/00; H05B 6/00
[52] U.S. Cl. ................... 426/242; 426/496; 426/502; 426/637
[58] Field of Search ................... 426/242, 496, 426/504, 637, 523, 502

[56] References Cited

U.S. PATENT DOCUMENTS 4,367,241  1/1983  Chablaix ................... 426/242
5,077,074  12/1991  Van Lengerich ................... 426/504

OTHER PUBLICATIONS

Julia Child, "The Way to Cook", p. 38 and pp. 388–404, Alfred A. Knopf, Inc., New York 1989.

Irma S. Rombauer, Marion Rombauer Becker, "Joy of Cooking", pp. 593–598, The Bobbs–Merrill Company, Indiana, 1981.

*Primary Examiner*—George Yeung
*Attorney, Agent, or Firm*—Oblon, Spivak, McClelland, Maier & Neustadt, P.C.

[57] ABSTRACT

A process for making a layered and puffed pastry is disclosed. The process includes the steps of producing a dough by mixing a raw material with water, wherein the raw material does not contain a wheat flour, shaping the dough into a plurality of layers to obtain a layered dough; baking the layered dough in a thermal cycle oven; and drying the baked layered dough with microwaves, radio waves or infrared rays to obtain the layered and puffed pastry.

30 Claims, No Drawings

PROCESS FOR PREPARING LAYERED AND PUFFED PASTRY PRODUCTS

BACKGROUND OF THE INVENTION

1. Field of the Invention

This invention relates to an oven product of sweet or salted puff-pastry type.

2. Description of the Background

The state of the art describes oven products of sweet or salted puff-pastry type, only starting from wheat flour.

The object of the present invention is to provide a product of different flavour, taste and attractiveness, using cereals, starches etc., ie raw materials different from the wheat flour generally used in producing oven products of puff-pastry type.

SUMMARY OF THE INVENTION

The present invention provides an oven product of sweet or salted puff-pastry type, obtained by the following stages:

- a first stage comprising kneading in which the raw material is mixed with water;
- a second stage comprising shaping the product thus obtained;
- a third stage comprising cooking in ovens using a cracker or biscuit thermal cycle;
- a fourth stage comprising further drying with microwaves, radiofreguency or infrared rays, and excluding wheat flour as raw material.

DETAILED DESCRIPTION OF THE INVENTION

In particular the raw material consists of peeled boiled potato.

The shaping second stage comprises lamination from 4 to 36 folds. The main advantage of the oven product of puff-pastry type of the present invention is that it can be prepared from many different raw materials, using always the same method.

In this respect, a product with the typical structure of puff-pastry can be obtained starting from different raw materials. The characteristics and advantages of the product of the present invention will be more apparent from the detailed description thereof given hereinafter by way of example.

In particular, the raw material used in the first stage of the method for preparing an oven product of sweet or salted puff-pastry type can also consist of potato flakes, potato granules, precooked maize; potato, maize, wheat, fecula, tapioca/cassava starch; precooked millet, sorghum, rye, barley, oats and rice; either alone or in suitable mixture.

In this first stage the selected raw material is kneaded with water and possibly salt and binders for the dough. The binder can consist of modified starches.

In particular, during this first stage for preparing the oven product of sweet or salted puff-pastry type, oils, fats and sugars can be added.

The fats can be margarine, butter and lard, and the vegetable oils can be chosen from olive oil, various seed oils, corn oil, sunflower oil, etc.

These oils or fats are added up to a maximum quantity of 30 parts (by weight) per 100 parts of raw material.

Again, during this first stage the product can be flavoured by the possible addition of dough flavourings and/or seasonings, which are dispersed and/or dissolved and sprayed.

Typical milk ferments for bread and/or typical bread yeasts and bacteria, sugar and sweeteners can also be added.

Glutin, albumin, milk proteins, soya proteins, protein strengtheners such as ascorbic acid, cysteine and oxidants, monoglycerides and enzymes can also be added.

The second stage involving shaping comprises lamination from 4 to 36 folds.

It hence comprises a first rolling, insertion of fats, a second rolling and so on to achieve the desired lamination.

High-melting fats typical of puff-pastry are added in this second stage.

The stratified product of puff-pastry type obtained in this manner is then baked in a thermal cycle oven on heavy mesh or steel bands for a time of between 5 and 15 minutes at a temperature of between 250° C. and 300° C. until a moisture content of 15–20% is attained. There then follows a fourth stage involving drying the product of puff-pastry type at a temperature of between 100° C. and 110° C. for a time of between 3 and 60 minutes using infrared rays, radiofrequency or microwaves, until a moisture content of less than 10% is attained.

As already stated, the main advantage of the oven product of sweet or salted puff-pastry type, of the present invention, is that it can be prepared starting from many different raw materials, while always using the same method.

In addition, the product of sweet or salted puff-pastry type obtained has the typical puff-pastry structure whichever raw material is used.

We claim:

1. A layered and puffed pastry, produced by a process comprising:
   producing a dough by mixing a raw material with water, wherein the raw material does not contain a wheat flour;
   shaping the dough into a plurality of layers to obtain a layered dough;
   baking the layered dough in a thermal cycle oven; and
   drying the baked layered dough with microwaves, radio waves or infrared rays to obtain the layered and puffed pastry.

2. The layered and puffed pastry of claim 1, wherein the raw material comprises at least one member selected from the group consisting of potato flakes, potato granules, potato, precooked maize, maize, fecula, tapioca/cassava starch, precooked millet, sorghum, rye, barley, oats and rice.

3. The layered and puffed pastry of claim 1, wherein the raw material comprises peeled boiled potato.

4. The layered and puffed pastry of claim 1, wherein the dough is shaped into 4 to 36 layers in the shaping step.

5. The layered and puffed pastry of claim 1 wherein high-melting fats are applied to each layer in the shaping step.

6. The layered and puffed pastry of claim 1, wherein a salt is also mixed with the raw material and the water to produce the dough.

7. The layered and puffed pastry of claim 1, wherein a dough binder is also mixed with the raw material and the water to produce the dough.

8. The layered and puffed pastry of claim 7, wherein the dough binder comprises a modified starch.

9. The layered and puffed pastry of claim 1, wherein up to 30 parts by weight of at least one fat is also mixed with 100 parts by weight of the raw material and the water to produce the dough.

10. The layered and puffed pastry of claim 9, wherein the at least one fat is selected from the group consisting of margarine, butter, lard, vegetable oils and seed oils.

11. The layered and puffed pastry of claim 1, wherein at least one additive selected from the group consisting of milk ferments, bread yeasts, bread bacteria, sugars and sweeteners is also mixed with the raw material and the water to produce the dough.

12. The layered and puffed pastry of claim 1, wherein at least one additive selected from the group consisting of glutin, albumin, milk proteins, soya proteins, ascorbic acid, cysteine, oxidants, monoglycerides and enzymes is also mixed with the raw material and the water to produce the dough.

13. The layered and puffed pastry of claim 1, wherein a dough flavoring, a dough seasoning, or both, are also mixed with the raw material and the water to produce the dough.

14. The layered and puffed pastry of claim 1, wherein the layered dough is baked for 1 to 15 minutes at a temperature of 250° to 300° C. until the baked dough has a moisture content of 15 to 20%.

15. The layered and puffed pastry of claim 1, wherein the drying step is conducted at 100° to 110° C. for 3 to 60 minutes to produce the layered and puffed pastry having a moisture content of less than 10%.

16. A process of making a layered and puffed pastry, comprising:

producing a dough by mixing a raw material with water, wherein the raw material does not contain a wheat flour;

shaping the dough into a plurality of layers to obtain a layered dough;

baking the layered dough in a thermal cycle oven; and drying the baked layered dough with microwaves, radio waves or infrared rays to obtain the layered and puffed pastry.

17. The method of claim 16, wherein the raw material comprises at least one member selected from the group consisting of potato flakes, potato granules, potato, pre-cooked maize, maize, fecula, tapioca/cassava starch, pre-cooked millet, sorghum, rye, barley, oats and rice.

18. The method of claim 16, wherein the raw material comprises peeled boiled potato.

19. The method of claim 16, wherein the dough is shaped into 4 to 36 layers in the shaping step.

20. The method of claim 16, wherein high-melting fats are applied to each layer in the shaping step.

21. The method of claim 16, wherein a salt is also mixed with the raw material and the water to produce the dough.

22. The method of claim 16, wherein a dough binder is also mixed with the raw material and the water to produce the dough.

23. The method of claim 22, wherein the dough binder comprises a modified starch.

24. The method of claim 16, wherein up to 30 parts by weight of at least one fat is also mixed with 100 parts by weight of the raw material and the water to produce the dough.

25. The method of claim 24, wherein the at least one fat is selected from the group consisting of margarine, butter, lard, vegetable oils and seed oils.

26. The method of claim 16, wherein at least one additive selected from the group consisting of milk ferments, bread yeasts, bread bacteria, sugars and sweeteners is also mixed with the raw material and the water to produce the dough.

27. The method of claim 16, wherein at least one additive selected from the group consisting of glutin, albumin, milk proteins, soya proteins, ascorbic acid, cysteine, oxidants, monoglycerides and enzymes is also mixed with the raw material and the water to produce the dough.

28. The method of claim 16, wherein a dough flavoring, a dough seasoning, or both, are also mixed with the raw material and the water to produce the dough.

29. The method of claim 16, wherein the layered dough is baked for 1 to 15 minutes at a temperature of 250° to 300° C. until the baked dough has a moisture content of 15 to 20%.

30. The method of claim 16, wherein the drying step is conducted at 100° to 110° C. for 3 to 60 minutes to produce the layered and puffed pastry having a moisture content of less than 10%.

\* \* \* \* \*